Dec. 19, 1933. K. NAGEL 1,940,367
METHOD FOR THE PRODUCTION OF THREADS IN SCREW THREAD ROLLING CHEEKS
Filed Sept. 26, 1931
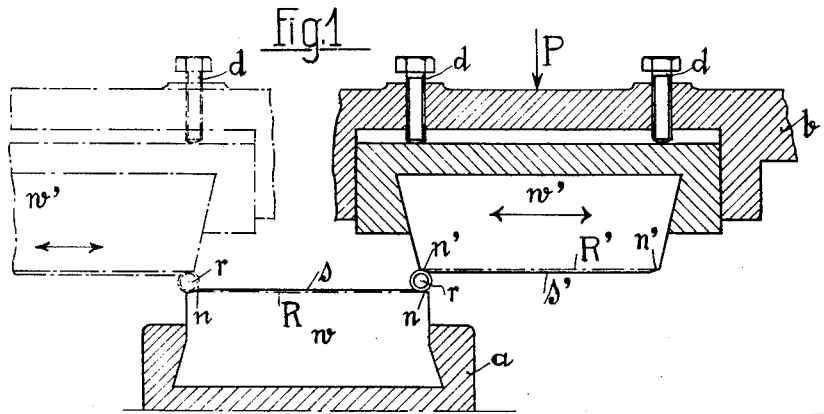
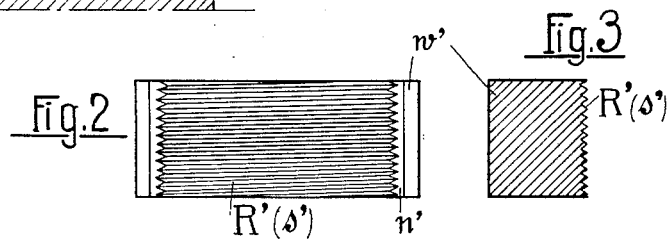
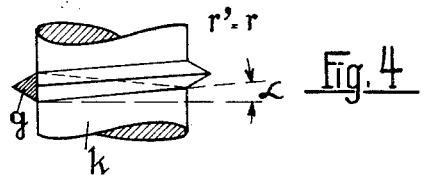
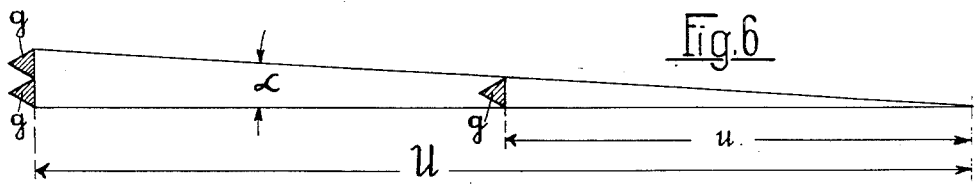
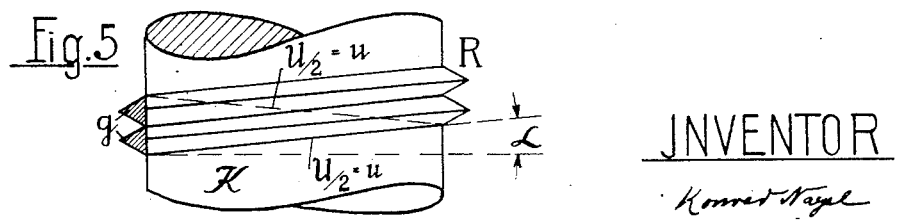
INVENTOR
Konrad Nagel Patented Dec. 19, 1933

1,940,367

UNITED STATES PATENT OFFICE 1,940,367

METHOD FOR THE PRODUCTION OF THREADS IN SCREW-THREAD ROLLING CHEEKS

Konrad Nagel, Nuremberg, Germany, assignor of one-half to Heinrich Fuld and one-half to Ernst Hessdorfer, both of Nuremberg, Germany Application September 26, 1931, Serial No. 565,388, and in Germany July 24, 1931

5 Claims. (Cl. 80—9)

For the production of thread rolling dies with intersecting grooves and ribs which cannot be produced by milling it has been proposed to produce the intersecting grooves and ribs by rolling between the dies a hardened screw bolt with right and left intersecting sharp thread. This proposal has however not given satisfaction. Owing to the fact that the right and left intersecting thread ribs cover one another from diametrically opposite vertexes gradually up to the core bolt, an oval screw bolt is produced instead of a circular one. During the rolling of the screw bolt between the die faces, which are still soft and have been ground plane, transverse depressions are produced in the die, owing to the fact that the tool-screw bolt acts alternately with a larger and smaller diameter upon said faces. It has further been found that the ribs of the hardened tool-screw bolt are torn out at certain points, especially in the proximity of the die edges. The blanks rolled with such dies after they have been hardened, the blank consisting especially of spindles of bicycle pedals, are evidently faulty. They become unround and the intersecting threads are partly crushed and the grooves are partly filled with material. Such a spindle could not be screwed into the eye of the pedal crank having right and left hand thread. If the connecting bolt could however be screwed in, it would, owing to the great difference between its outer diameter measured in two directions the one perpendicular to the other, shake so much that the pedal is not securely seated. This proposal has therefore not given any practical and useful result.

In thread rolling dies with grooves and ribs which are parallel the one to the other and not intersecting, the grooves were hitherto produced by milling.

This invention makes it possible to produce grooves and ribs parallel the one to the other in rolling dies for ordinary right and left hand threads by rolling a right or left hand thread tool-screw bolt which is larger than the screw bolt to be finally produced between the plane working faces, which are still soft and perfect, so that they are superior in every respect to the milled die grooves and ribs. The advantages of the rolled threads will be explained in connection with the detailed description of the drawing.

The devices and tools for carrying out the new method are illustrated by way of example on the accompanying drawing in which:

Fig. 1 shows in top plan view how the tool-screw bolt is rolled between the thread rolling dies for producing parallel grooves and ribs on the same.

Fig. 2 is an end view and

Fig. 3 is a cross section showing the thread rolling die adapted to be shifted to and fro.

Fig. 4 shows a single thread screw.

Fig. 5 shows a double thread tool-screw bolt.

Fig. 6 illustrates the development of the finished screw and of the tool screw bolt.

One rolling die blank $w$ is mounted stationary and rigidly in the machine frame $a$, whereas in the reciprocating machine carriage $b$ the other rolling die blank $w'$ is mounted so that it can be adjusted in lateral directions. The constructional adjusting means, which may be varied as desired, are only indicated by pressure screws $d$ as not belonging to the method. The primarily plane end faces $s$, $s'$ of the rolling die tools terminate in slightly inclined ramps $n$, $n'$ between which the hardened tool screw bolt $r$, made of special steel, is introduced. If the tool screw bolt has been introduced for example over the right ramp surface $n$, it will be gripped by the left ramp surface $n'$ of the end surface $s'$ during the shifting of the carriage $b$ towards the left, and rolled between the two end faces $s$, $s'$ under the lateral pressure P into the extreme position indicated by dot-dash lines. In order to compel a pressing in first of all the screw thread apexes into the end faces $s$, $s'$, the distance of the end face $s'$ from the end face $s$ is adjusted already at the beginning slightly smaller than the exterior diameter of the tool screw bolt. By repeating this rolling and readjustment of the end face $s'$ after each or several rollings, the screw thread grooves $f$, $f'$ are produced as accurate negative of the developed screw bolt thread. It is obvious, that this rolling of the grooves into the rolling die blanks takes place much quicker, cheaper and more accurately than their careful milling. There is also no waste of steel, because no chips are planed off, and the grooves, as when rolling screw threads, are produced partly by displacing and partly by a rising of the material of the blank. Experiments have shown, that the insertion of a pair of rolling die blanks, the simultaneous rolling in of the grooves and the removing of the finished screw thread rolling dies requires only about 20 minutes, that is about $\frac{1}{24}$ of the time hitherto required for milling the grooves.

Moreover, the resistance of the screw thread ridges remaining between the grooves is much greater than that of the ridges remaining between milled grooves. The fibres of the material are not cut through as in the case of milling but are only displaced, whereas at the same time a considerable increasing of the density and smoothing of the surface of the material skin occurs owing to the great lateral pressure and the high polish of the tool screw bolt.

Other very considerable advantages are obtained as compared with milled screw thread rolling dies when the rolled screw thread rolling dies are used in the screw thread rolling machine. The ridges of the die working surfaces, rolled in common by the same tool threaded screw, register absolutely accurately in the machine, without previous re-adjusting, merely by placing them in die boxes, by which they are accurately clasped. The controlling of the accurate fitting is limited to ascertaining that the surfaces of the cooperating dies are mutually flush, and that no undesired mutual difference in height is produced by any foreign bodies which may have got into the die boxes. As is known, the individual milled screw thread rolling dies must be accurately adjusted the one relative to the other in height and in transverse direction. Such extremely small differences have to be equalized, that for obtaining the correct adjustment very long practice is required and most workers never become sufficiently proficient for effecting this fine adjustment. When employing the new screw thread rolling dies, all this readjusting work is dispensed with, and consequently a saving in time attained in the production.

When the rolled screw thread ridges have become worn, it is not necessary to re-mill same in an expensive manner, as in the case of milled screw thread grooves, but it is sufficient to roll them with the tool screw bolt with which they were originally rolled. The screw thread need not be completely ground off the die before the re-rolling, it being sufficient to grind down only the apexes of the damaged screw thread portions.

Consequently, as compared with the rolling dies with milled grooves, considerable improvements are obtained as regards the cost of the tools, the cost of production of the screw thread rolling dies, the simplification and cheapening of the attendance of the bolt screw thread rolling machine and the degree of perfection and smoothness of the screw bolt rolled with the new dies.

The experiments were carried out with the tool screw bolt which corresponds accurately with the finished screw bolt.

When rolling the screw thread rolling die grooves for fine screw threads of thinner screws, for example of less than $\frac{5}{16}''$, there exists the danger of bursting or crushing of the tool screw bolt between the dies under the excessive lateral pressure, which is necessary for rolling in the screw thread grooves. This danger seems to make the employment of the new method impossible for thinner screws with very fine screw threads.

According to a further feature of the invention the application of the method is possible, whilst avoiding the above mentioned danger, also for rolling the screw thread rolling die grooves for such screws, in that tool screw bolts having the desired screw thread longitudinal section are used, the core diameter and thread of which is an even multiple of the core diameter or thread of the screw bolt to be rolled. Such a tool screw rolls grooves in the screw thread rolling die blanks having the same pitch as the thinner tool screw bolt, all the dimensions of which must be the same as those of the finished screw.

For rolling grooves for single thread $\frac{5}{16}''$ screws a tool screw bolt will consequently be selected, the core diameter of which is preferably twice as large as that of the $\frac{5}{16}''$ screw and the longitudinal section of the thread (through the bolt axis) will be placed twice one above the other on the bolt core, so that therefore a double thread screw is obtained. For still thinner screws a tool screw bolt will be employed with a three thread bolt core three times as thick, whereas for screws of 2 mms. and less five or more thread tool screw bolts with a bolt core diameter five or more times as great will be employed.

Experiments have shown, that with rolling die grooves thus produced, thinner screws also run absolutely accurately and to pitch in the master nut.

$u$ is the development or the circumferential length of the core $k$ of the single thread thin screw $r'$ to be produced with the screw thread longitudinal section $g$ and the pitch angle $a$. $U$ is the development or the circumferential length of the core $K$ of twice the thickness for the tool screw bolt $R$ with two screw thread cross sections $g$ per pitch. As can be seen, the tool screw bolt, with the superposed arrangement of the two like screw thread longitudinal sections $g$, that is with its double thread, has the same pitch angle $a$ as the finished screw $r''$.

It has further been found, that the employment of tool screw bolts enlarged according to the same principle is preferable also for producing or at least for smoothing rolling die grooves for screws exceeding $\frac{5}{16}''$. As the threads of the enlarged tool screw bolt adapt themselves, for a greater length corresponding to their enlargement, to the grooves produced than a tool screw bolt similar to the finished screw, a greater lateral pressure and consequently greater driving power is necessary for the groove rolling machine for rolling in the grooves. This disadvantage is however counterbalanced by the advantage, that chattering lateral pressure variations due to vibrations of the machine frame are distributed over larger groove faces and consequently produce neither depressions nor bulges. Consequently, grooves are produced which are superior the milled grooves as regards uniformity and smoothness.

It is advisable to preliminarily roll the grooves with tool screw bolts, similar to the finished screw, in order that the driving power required be as low as possible, and to remove, by subsequent rolling with the enlarged tool screw bolt, from the preliminarily rolled grooves any depressions or bulges which might exist in the same, i. e. to smooth the grooves without excessive driving power. By this subsequent rolling any slight distortion of the pitch (departure from the accurate standard pitch) caused by the rough rolling is automatically removed.

I claim:

1. A method for producing grooves in screw thread rolling cheeks, consisting of rolling in grooves by rolling a hardened tool screw bolt having the desired screw thread longitudinal section and a core diameter and the number of thread of a complete multiple of the core diameter and the number of thread of the screw bolt to be rolled between plane faces of rolling cheek blanks.

2. A method for producing non-intersecting parallel grooves and ribs in screw thread rolling cheeks wherein the grooves are rolled in by a hardened tool screw bolt between plane faces of rolling cheek blanks, consisting of preliminarily rolling the screw thread rolling cheek with a tool screw bolt corresponding to the finished screw bolts to be produced, and in finish rolling said grooves with a tool screw bolt having a core diameter and a number of thread equal to a complete multiple of the core diameter and number of thread of the finished bolts to be produced.

3. A method for producing grooves in screw thread rolling cheeks, consisting of rolling in grooves by rolling a hardened tool screw bolt having a core diameter and number of thread equal to a complete multiple of the core diameter and number of thread of the bolts to be rolled, between plane faces of rolling cheek blanks.

4. A method for the production of thread rolling dies with grooves and ribs consisting of preliminarily rolling in the grooves and ribs by rolling a tool screw bolt, accurately similar to the screw bolt to be produced, between plane faces of the rolling die blanks and then rolling in the grooves and ribs with a larger tool screw bolt to finish and smooth the faces of the ribs and grooves.

5. A method for the production of thread rolling dies with non-intersecting parallel grooves and ribs consisting of preliminarily rolling in the grooves and ribs by rolling a tool screw bolt, accurately similar to the screw bolt to be produced, between plane faces of the rolling die blanks and then rolling in the grooves and ribs with a larger tool screw bolt to finish and smooth the faces of the ribs and grooves.

KONRAD NAGEL.